United States Patent Office 2,819,275
Patented Jan. 7, 1958

2,819,275

PROCESS FOR THE MANUFACTURE OF NEW ANTHRAQUINONE COMPOUNDS

Paul Grossmann, Binningen, Walter Jenny, Reinach, and Walter Kern, Sissach, Switzerland, assignors to Ciba Limited, Basel, Switzerland, a Swiss firm No Drawing. Application January 10, 1955
Serial No. 481,014

Claims priority, application Switzerland January 14, 1954

10 Claims. (Cl. 260—380)

The present invention provides valuable new anthraquinone compounds by reacting an anthraquinone having two hydroxyl groups in α-positions and two nitro groups in α-positions, only one of the hydroxyl groups and one of the nitro groups being bound to the same six-membered ring, in the presence of a tertiary amine whose nitrogen atom is bound to at least two aliphatic carbon atoms, with a primary amine, the nitrogen atom of which is bound to a cyclic carbon atom, and by selecting the starting materials in such a way that the end products of the process are free from water-solubilizing groups.

From the above remarks it is clear that in the present process, for example, either 1:5-dihydroxy-4:8-dinitroanthraquinone or 1:8 - dihydroxy - 4:5 - dinitro-anthraquinone can be used as starting material. If desired, a mixture of these two dihydroxy-di-nitro-anthraquinones may be used as obtained according to the process of Patent No. 2,485,197 and which mixture contains in addition to the mentioned dihydroxy-di-nitro-anthraquinones other anthraquinone derivatives.

These compounds are reacted with a primary amine free from water-solubilizing groups, such as sulfonic acid groups and carboxylic acid groups, and whose nitrogen atom is bound to a cylic carbon atom. As a cyclic carbon atom is, as usual, such a one to be understood as belongs to a heterocyclic or carbocyclic ring. In the present process there can be used, for example, an aminofurane, an amino-thiophene, an aminothiazole or an amino-pyridine. Of particular interest are the amines of the benzene series, such for example as aminobenzene, or nuclear-substituted aminobenzenes. These may contain the ordinary, non-water-solubilizing substituents, for example low molecular alkyl or alkoxy groups, such as methyl, ethyl, methoxy or ethoxy groups, and halogen atoms, such as bromine or chlorine. As examples of suitable aminobenzenes there may be mentioned 1-amino-2-, -3- or -4-methylbenzene, 1-amino-2-, -3- or -4-chlorobenzene, 1-amino-2:5- or 3:5-dimethylbenzene-1-amino-2- or - 4-methoxybenzene, and 1 - amino - 2 - methoxy-5-methylbenzene.

In the process of the invention the reaction of the dihydroxy-dinitro-anthraquinone with a primary amine of the kind mentioned takes place in the presence of a tertiary amine. The nitrogen atom of the tertiary amine is bound to at least two aliphatic carbon atoms. The third carbon atom bound to the nitrogen can be a cyclic carbon atom, for example an aryl atom. The aliphatic carbon atoms or carbon chains bound in the tertiary amines on the one side to the nitrogen atom can be bound on the other side to heterocyclic or carbocyclic rings, which, for example, is the case in tertiary benzylamines.

As a rule, especially good results are obtained with purely aliphatic amines, that is to say with those which contain no rings of any kind whatsoever. It is advantageous to use monoamines. The aliphatic radicals bound to the nitrogen atom in these tertiary purely aliphatic amines can be identical or different. They can be unsaturated or preferably saturated aliphatic hydrocarbons. In addition to alkyl radicals or instead of them, the amines can contain also hydroxyalkyl radicals with one or more than one hydroxyl group. Suitable tertiary amines are, for example, those whose nitrogen atoms are bound to three radicals of the formula

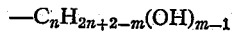
$$-C_nH_{2n+2-m}(OH)_{m-1}$$

wherein $m$ is a whole number of at most 2, $n$ is a whole number, advantageously of at most 5, and $m$ is never greater than $n$. The three alkyl or hydroxyalkyl groups bound to the nitrogen atom can be identical or different; it goes without saying that two of these can be identical and one different. As examples of tertiary amines of this kind there may be mentioned: trimethylamine, triethylamine, tri-n-butylamine, triethanolamine, tri-isopropanolamine, diethylethanolamine, methyldiethanolamine, butyldiethanolamine. Mixtures of different tertiary amines of the kind mentioned can also be used.

The quantitative ratio in which the substances of the present invention are reacted can vary within a wide range. In general, it is advisable to use substantially more than one mol of the primary as well as of the tertiary amine to one mol of dihydroxy-dinitro-anthraquinone. Good results are obtained, if for each mol of dihydroxy-dinitroanthraquinone at least 2 mols of primary amine and at least 2 mols of tertiary amine are used. The reaction is carried out with advantage at a raised temperature, preferably at a temperature between about 90 and 180° C. As a rule it is also advisable to maintain the reaction mixture for several hours at this temperature. If desired, the reaction can be carried out in a closed vessel under pressure; this is particularly advantageous if the reaction takes place in the presence of an amine with a low boiling point. It is also an advantage to carry out the reaction in an anhydrous medium or in the absence of any quantity of water worth mentioning.

The new anthraquinone compounds obtainable according to the process of the invention are of unknown constitution. It is highly surprising that the presence of the tertiary amine modifies the course of the otherwise known reaction between the nitro-anthraquinone and the primary amine to such an extent as to produce distinctly different and improved end products, although no reaction mechanism is known or is apparent which might explain this result. The products of the reaction are intensively colored substances suitable for dyeing various materials. They can for example be used as pigments. Chiefly they are suitable, especially after a suitable pasting which can also be connected with a reprecipitation, for example from sulfuric acid, for dyeing according to the known dispersion dyeing method with the addition of the usual dispersing agents, such as for example sulfite cellulose waste liquor, tetrahydrofurane, tetrahydrofurfuryl alcohol, condensation products from higher alcohols and ethylene oxide, soap, sodium-μ-heptadecyl-N-benzylbenzimidazole-disulfonate. Such dispersing agents can be mixed with the dyestuffs with advantage when pasting. Among the materials capable of being dyed in this manner there may be mentioned, for example structures from cellulose esters, such as acetate rayon, and those from superpolyamides or superpolyurethanes, such as nylon.

These dyestuffs are, however, particularly advantageous and of great yield when used to dye and print materials from polyesters of aromatic dicarboxylic acids according to the dispersion method. For this purpose there come into consideration for example, foils, particularly fibers of this type, preferably those from polyesters of terephthalic acid. There may also be used staple fibers or fibers from endless filaments, for example the products obtainable under the names "Dacron" and "Terylene,"

In materials of this composition the dyeing process is advantageously carried out at a raised temperature, for example at boiling temperature of the dyebath. If the operation is carried out in a closed vessel, dyeing can be undertaken at a higher temperature and under pressure. This, however, is not necessary to obtain deeper tints in some cases. If desired, there may be added to the dyebath a certain quantity of a swelling agent, such as phenyl-methyl carbinol, benzoic acid, ortho-phenyl-phenol or chlorobenzene, the affinity, which is generally in any case very good, being thus enhanced.

The following examples illustrate the invention, the parts and percentages being by weight.

Example 1

5 parts of 1:8-dihydroxy-4:5-dinitro-anthraquinone are heated in 25 parts of tri-isopropanolamine with 10 parts of aminobenzene for 9 hours at 160° C. When cold, 50 parts of methanol, 30 parts of hydrochloric acid of 36 percent strength and 20 parts of water are added. The precipitated dyestuff is filtered off, washed with water and dried. The dyestuff is reprecipitated from sulfuric acid of about 85 percent strength and ground with a dispersing agent, such as for example cellulose sulfite waste liquor. It dyes "Dacron" and acetate rayon in very full blue shades.

In the place of tri-isopropanolamine there may be used diethylethanolamine, methyldiethanolamine or tributylamine.

Example 2

5 parts of 1:8-dihydroxy-4:5-dinitro-anthraquinone are heated in 20 parts of aminobenzene with 10 parts of butyldiethanolamine for 13 hours at 140° C. The dyestuff is isolated and pasted as described in Example 1. The dyestuff dyes in similar full blue tints as those described in Example 1.

Example 3

5 parts of 1:8-dihydroxy-4:5-dinitro-anthraquinone are heated in 25 parts of aminobenzene with 5 parts of methyldiethanolamine for 25 hours at 125° C. The dyestuff is isolated and pasted as described in Example 1. The dyestuff dyes acetate rayon and "Dacron" in less full shades than the dyes described in Examples 1 and 2, but still more than double as full as a dyestuff obtained without the addition of a tertiary amine.

Example 4

5 parts of 1:5-dihydroxy-4:8-dinitro-anthraquinone are heated in 25 parts of butyl-diethanolamine with 10 parts of 1-amino-3-methyl-benzene for 8 hours at 140–150° C. The dyestuff is isolated and pasted as described in Example 1. The dyestuff dyes "Dacron" and acetate rayon in very full reddish blue shades.

Example 5

5 parts of 1:8-dihydroxy-4:5-dinitro-anthraquinone are heated in 25 parts of tri-isopropanolamine and 12 parts of 1-amino-4-chlorobenzene for 10 hours at 160° C. The dyestuff is isolated and pasted as described in Example 1. It dyes "Dacron" and acetate rayon in very full pure blue tints.

Example 6

5 parts of a crude mixture of 1:5-dihydroxy-4:8-dinitro- and 1:8-dihydroxy-4:5-dinitro-anthraquinone (obtained without any intermediate purification by exchanging nitro groups of the crude dinitro-anthraquinone for methoxy groups, nitrating the resulting product and cleavage of the methoxy groups) are heated in 5 parts of 1-amino-3-methylbenzene and 25 parts of tri-isopropanolamine for 5 hours at 160° C. The dyestuff is isolated and pasted as described in Example 1. It dyes "Terylene" and acetate rayon in very full reddish blue tints.

If, in place of 5 parts of 1-amino-3-methylbenzene, 10 parts are used, the dyeings obtained are less reddish blue.

If, in place of the crude dinitro-anthraquinone mixture, a mixture consisting of equal parts of 1:5-dihydroxy-4:8-dinitro- and 1:8-dihydroxy-4:5-dinitro-anthraquinone is used, there are obtained dyeings of a very full pure blue.

Example 7

5 parts of 1:8-dihydroxy-4:5-dinitro-anthraquinone are heated with 25 parts of 1-amino-2-methoxybenzene and 5 parts of methyl-diethanolamine for 20 hours at 125–130° C. The dyestuff is isolated and pasted as described in Example 1. The dyestuff dyes acetate rayon in full pure blue tints.

If, instead of 1-amino-2-methoxybenzene there is used 1-amino-4-methoxybenzene, a dyestuff is obtained which yields more greenish dyeings.

Example 8

5 parts of 1:8-dihydroxy-4:5-dinitro-anthraquinone are heated in 25 parts of tri-isopropanolamine with 10 parts of β-naphthylamine for 5 hours at 155–160° C. The dyestuff is isolated and pasted as described in Example 1. It dyes acetate rayon in pure blue tints.

Example 9

5 parts of 1:8-dihydroxy-4:5-dinitro-anthraquinone are heated in 25 parts of tri-isopropanolamine with 6 parts of 2-aminopyridine for 30 hours at 140° C. The dyestuff is isolated and pasted as described in Example 1. It dyes acetate rayon in full pure reddish blue tints.

Example 10

2 parts of the dyestuff obtainable according to Example 4 are ground wet with 2 parts of an aqueous solution of 50 percent strength of sulfite cellulose waste liquor and dried.

The dyestuff is pasted with 8 parts of ethyl alcohol, stirred with 20 parts of an aqueous solution of 10 percent strength of a condensation product of octadecyl alcohol with 20 mols of ethylene oxide, and by diluting the mixture with water a dyebath of 4000 parts is prepared. Into this bath 100 parts of a staple yarn from polyesters of terephthalic acid, for example such as is obtainable in commerce under the name "Dacron" or "Terylene," are entered at 60° C., the temperature is raised to the boil within half an hour and dyeing is carried on for an hour at that temperature. The material is then rinsed and dried. A full blue dyeing with good fastness properties is obtained.

What is claimed is:

1. An anthraquinone compound obtained by a process which comprises reacting an anthraquinone of the formula

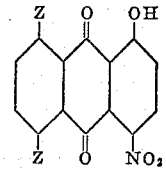

in which one Z represents a hydroxy group and the other Z a nitro group, in the presence of a tertiary monoamine whose nitrogen atom is bound to three aliphatic radicals, each of these radicals corresponding to the formula $$-C_nH_{2n+2-m}(OH)_{m-1}$$

in which $m$ is a whole number not greater than 2 and $n$ a whole number not greater than 5 and $m$ is at most equal to $n$, with an amine of the formula

in which X is a member selected from the group consisting of hydrogen, halogen, alkyl and alkoxy, said alkyl and alkoxy each having at most 5 carbon atoms and $m$ is a whole number not greater than 2.

2. Process for the manufacture of anthraquinone compounds, which comprises reacting at a temperature of 90–180° C. an anthraquinone having two hydroxyl groups in α-positions and two nitro groups in α-positions, only one of the hydroxyl groups and one of the nitro groups being bound to the same six-membered ring, said anthraquinone being free from other functional groups, in the presence of a tertiary monoamine whose nitrogen atom is bound to three aliphatic radicals, each of these three radicals corresponding to the formula $$C_nH_{2n+2-m}(OH)_{m-1}$$

in which $m$ is a whole number not greater than 2 and $n$ a whole number not greater than 5, and $m$ is at the most equal to $n$, with an amine of the formula

in which X is a member selected from the group consisting of hydrogen, halogen, alkyl and alkoxy, the alkyl and alkoxy each having at most 5 C-atoms.

3. Process for the manufacture of anthraquinone compounds, which comprises reacting at a temperature of 90–180° C. 1:8-dihydroxy-4:5-dinitro-anthraquinone in the presence of a tertiary monoamine whose nitrogen atom is bound to three aliphatic radicals, each having at most 5 carbon atoms, and of which radicals at least two have more than one carbon atom and are substituted by a hydroxyl group, with a primary amine of the formula

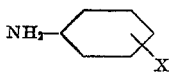

in which X is a member selected from the group consisting of hydrogen, halogen, alkyl and alkoxy, the alkyl and alkoxy each having at most 5 C-atoms.

4. Process for the manufacture of anthraquinone compounds which comprises reacting at a temperature of 90–180° C. 1:5-dihydroxy-4:8-dinitro-anthraquinone in the presence of a tertiary monoamine whose nitrogen atom is bound to three aliphatic radicals each having at most 5 carbon atoms and of which radicals at least two have more than one carbon atom and are substituted by a hydroxyl group, with a primary amine of the formula

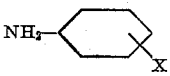

in which X is a member selected from the group consisting of hydrogen, halogen, alkyl and alkoxy, the alkyl and alkoxy each having at most 5 C-atoms.

5. Process for the manufacture of anthraquinone compounds which comprises reacting at a temperature of 90–180° C. a mixture of 1:8-dihydroxy-4:5-dinitro-anthraquinone and 1:5-dihydroxy-4:8-dinitroanthraquinone in the presence of a tertiary monoamine whose nitrogen atom is bound to three aliphatic radicals each having at most 5 carbon atoms and of which radicals at least two have more than one carbon atom and are substituted by a hydroxyl group, with a primary amine of the formula

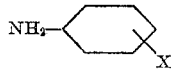

in which X is a member selected from the group consisting of hydrogen, halogen, alkyl and alkoxy, the alkyl and alkoxy each having at most 5 C-atoms.

6. An anthraquinone compound obtained by a process which comprises reacting at a temperature between 90–180° C. 1:8-dihydroxy-4:5-dinitro-anthraquinone in the presence of an aliphatic tertiary monoamine whose nitrogen atom is bound to three aliphatic radicals, each of them having at most 5 carbon atoms and of which radicals at least two have more than one carbon atom and are substituted by a hydroxy group, with aniline.

7. An anthraquinone compound obtained by a process which comprises reacting 1:8-dihydroxy-4:5-dinitro-anthraquinone with 1-amino-4-chlorobenzene in the presence of tri-isopropanolamine and at a temperature between 90 and 180° C.

8. An anthraquinone compound obtained by a process which comprises reacting 1:8-dihydroxy-4:5-dinotro-anthraquinone with 1-amino-2-methoxybenzene in the presence of methyldiethanolamine and at a temperature between 90 and 180° C.

9. An anthraquinone compound obtained by a process which comprises reacting 1:5-dihydroxy-4:8-dinitro-anthraquinone with 1-amino-3-methylbenzene in the presence of butyldiethanolamine and at a temperature between 90 and 180° C.

10. An anthraquinone compound obtained by a process which comprises reacting a mixture consisting of equal parts of 1:8-dihydroxy-4:5-dinitro-anthraquinone and 1:5-dihydroxy-4:8-dinitro-anthraquinone with 1-amino-3-methylbenzene in the presence of tri-isopropanolamine and at a temperature between 90 and 180° C.

References Cited in the file of this patent

UNITED STATES PATENTS

| 2,480,269 | Seymour | Aug. 30, 1949 |
| 2,485,197 | Grossmann | Oct. 18, 1949 |
| 2,641,602 | Straley | June 9, 1953 |
| 2,651,641 | Straley | Sept. 8, 1953 |

OTHER REFERENCES

Amer. Dyestuff Reporter for Dec. 7, 1953, p. 845.